UNITED STATES PATENT OFFICE.

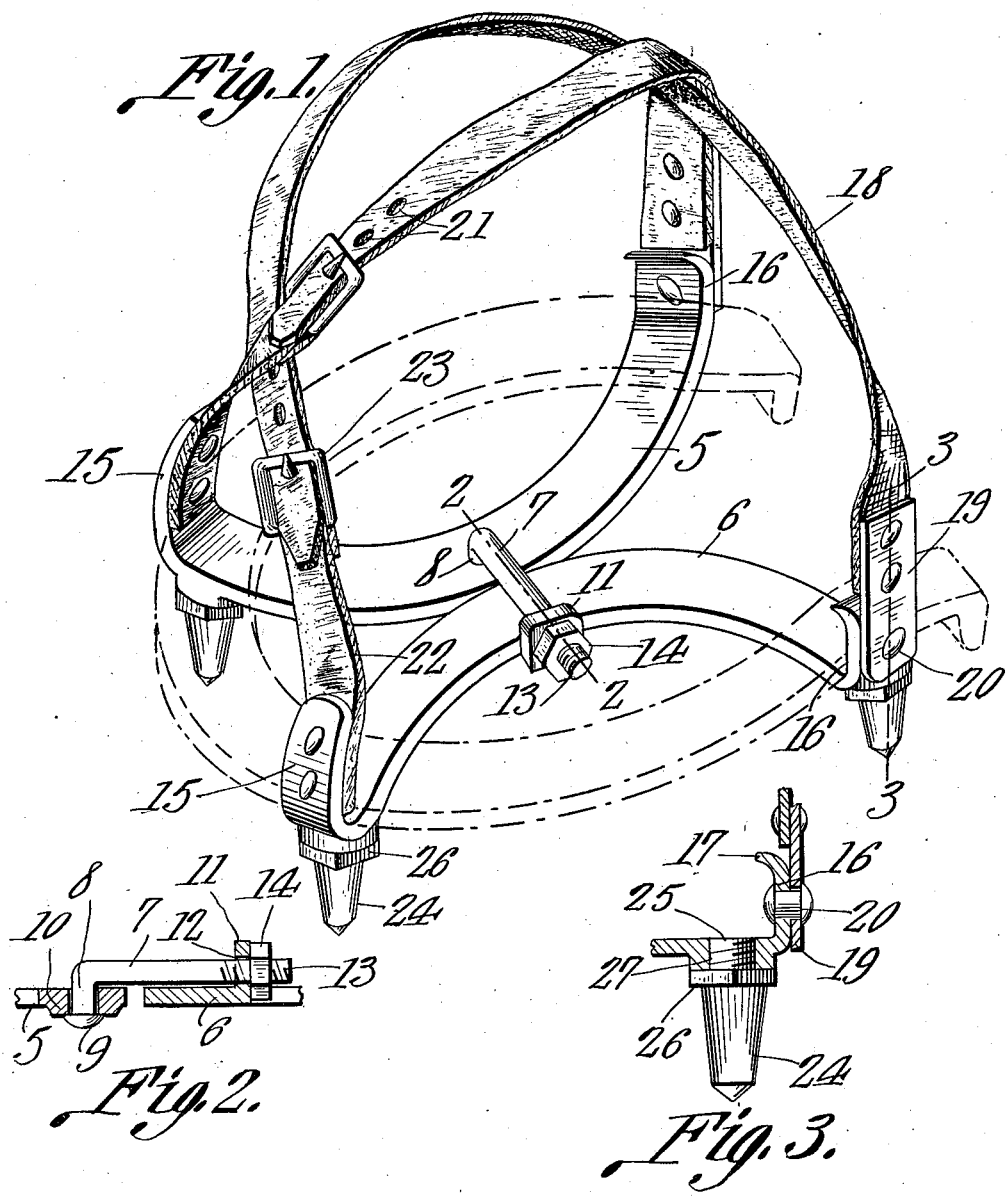

WILLIAM F. CUSTER, OF SUMMITVILLE, INDIANA.

AUXILIARY HORSESHOE.

1,000,327.  Specification of Letters Patent.  Patented Aug. 8, 1911.

Application filed July 11, 1910.  Serial No. 571,460.

*To all whom it may concern:*

Be it known that I, WILLIAM F. CUSTER, a citizen of the United States, residing at Summitville, in the county of Madison and State of Indiana, have invented a new and useful Auxiliary Horseshoe, of which the following is a specification.

It is the object of the present invention to provide an improved auxiliary horse shoe of such construction that it may be readily applied to any ordinary horse shoe and adjustable to adapt it for use in connection with a shoe of any ordinary size.

Incidentally, the invention aims to provide an auxiliary horse shoe having calks designed to prevent slipping upon icy surfaces.

Not only does the invention contemplate that the shoe shall be adjustable to shoes of different sizes but also that it shall be adjustable to shoes of various contours, the device embodying, briefly speaking, two members connected by a clamping bolt which has loose engagement with both members so that the members may have relative rocking movement at the time of initially applying the device to the shoe.

With the above and other objects in view, the invention consists in the general construction and arrangement of parts shown in the accompanying drawings, in which, Figure 1 is a perspective view of the device embodying the present invention, there being shown also in the said figure, in dotted lines, the horse shoe to which the device is applied. Fig. 2 is a vertical sectional view on the line 2—2 of Fig. 1. Fig. 3 is a similar view on the line 3—3 of Fig. 1.

In the drawings, the device is illustrated as including among other elements two arcuate members indicated one by the numeral 5 and the other by the numeral 6, these members being substantially of counterpart form and being preferably made from bar metal bent to the required shape. A clamping bolt indicated by the numeral 7 has one end turned downwardly at right angles as at 8 and headed as at 9, its portion 8, prior to being headed being inserted through an opening 10 formed in the member 5 at a point nearly midway between its ends, the fit of the portion 8 in the opening being a loose one so that the bolt may have free pivotal movement upon the member 5. The member 6 is formed at its concave edge with an upstanding ear indicated by the numeral 11 and this ear is formed with an opening 12 through which the other end of the bolt 7 is loosely engaged, its last mentioned end being threaded as at 13 and having fitted upon it a nut 14 which may be tightened to draw the two members 5 and 6 together, the members being arranged with their convex edges opposed as will be observed from an inspection of Fig. 1 of the drawings. Each of the members 5 and 6 is formed at its front end with an upturned shoe and hoof engaging portion indicated by the numeral 15 and at its rear end with a corresponding portion 16, these latter portions, however, having their extremities sharpened as at 17 to bite into the material of the hoof and more firmly hold the device in place when applied.

Before proceeding to a description of the other elements of the device, it will be here stated that when the device is to be applied to a shoe and hoof, the nut 14 is loosened and the members 5 and 6 are separated to such degree as to permit of them being placed flat against the under side of the shoe and with their upstanding hoof engaging portions 15 and 16 outwardly of the sides of the hoof. The members are then relatively rocked, if necessary, to properly position the device upon the hoof and shoe and the nut 14 is then firmly tightened. It will be observed that the portions 15 are inclined upwardly and rearwardly so that they will fit firmly against the inclined forward side of the hoof, when, as stated, the sharp edges of the extremities of the portions 16 will bite into the material of the hoof and firmly hold the rear ends of the members in place. As an additional means for holding the device upon the hoof, a strap 18 is connected at one of its ends to each upstanding portion 16, through the medium of a plate 19 which is pivoted as at 20 to the said upstanding portion and projects thereabove. Each of these straps is formed with a number of buckle tongue receiving openings 21 and other straps 22 are secured to the upstanding portions 15 at the forward ends of the members 5 and 6 and carry at their free ends, buckles 23 in which are secured the forward ends of the straps 18, these straps being crossed and brought around above the hoof in the manner illustrated in Fig. 1 of the drawings so that the straps will cross both at the rear and the front of the hoof. A calk 24 having a threaded stud portion 25, is formed also with a squared head 26 and has its stud portion 25 threaded into an opening 27 formed in each end of each member 5 and 6 of the device, by applying a wrench or similar tool to the said head 26.

It will be readily understood that a device, such as is above described may be readily applied to a hoof and shoe of any ordinary size and contour and that a wide range of adjustment is provided for by the feature of having the bolt 7 loosely connected to the two members 5 and 6 and having the plates 19 to which the straps are connected, freely pivoted upon the portions 16.

What is claimed is:—

A horse shoe attachment comprising a pair of arcuate members disposed with their convex edges in contact, means pivotally connecting the members, the ends of the members being upturned, and an adjustable strap secured at its front and rear ends to the front and rear upturned ends of each member, the straps upon the two members being crossed at a point adjacent their front end and at a point adjacent their rear ends.

In testimony that I claim the foregoing as my own, I have hereto affixed my signature in the presence of two witnesses.

WILLIAM F. CUSTER.

Witnesses:
 FRANK H. CUSTER,
 GEORGE R. MILLER.

---

Copies of this patent may be obtained for five cents each, by addressing the "Commissioner of Patents, Washington, D. C."